United States Patent
Siever et al.

(12) 
(10) Patent No.: US 6,368,719 B1
(45) Date of Patent: Apr. 9, 2002

(54) PROCESS FOR PREPARING MULTI-LAYER COATINGS ON AUTOMOTIVE BODIES OR AUTOMOTIVE BODY PARTS

(75) Inventors: Ludwig Siever, Schwelm; Walter Kuehhirt, Remscheid; Klausjoerg Klein; Karl-Friedrich Doessel, both of Wuppertal, all of (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/591,455

(22) Filed: Jun. 12, 2000

(51) Int. Cl.$^7$ ................................................ C25D 13/12
(52) U.S. Cl. .................... 428/457; 204/486; 204/488; 204/499; 204/484
(58) Field of Search ................. 204/484, 486, 204/488, 499; 428/457

(56) References Cited

U.S. PATENT DOCUMENTS

| | | | |
|---|---|---|---|
| 5,272,188 A | 12/1993 | Kriessmann et al. ........ | 523/412 |
| 5,389,219 A * | 2/1995 | Zwack et al. ................ | 204/488 |
| 5,882,734 A | 3/1999 | Blum et al. ............... | 427/407.1 |
| 5,908,667 A | 6/1999 | Blum et al. ............... | 427/407.1 |
| 6,080,296 A * | 6/2000 | Lieverz et al. .............. | 204/488 |

* cited by examiner

*Primary Examiner*—K. Mayekar
(74) *Attorney, Agent, or Firm*—Steven C. Benjamin

(57) ABSTRACT

A process for preparing a multi-layer coating on an electrically conductive automotive body or an electrically conductive automotive body part by applying a cathodic electrodeposition coating layer, optionally a further coating layer and an outer clear coating, in which the cathodic electrodeposition coating layer of a cathodic electrodeposition coating composition is applied which, as the cathodic electrodeposition binder, contains a seed polymer with an amine value of 30 to 100 mg KOH/g and a hydroxyl value of 50 to 200 mg KOH/g, which can be prepared by radical polymerisation of 70 to 97 wt-% of a monomer mixture comprising hydroxy-functional olefinically unsaturated monomer and amino-functional olefinically unsaturated monomer in the presence of 3 to 30 wt-% of an aminoepoxy resin.

10 Claims, No Drawings

PROCESS FOR PREPARING MULTI-LAYER COATINGS ON AUTOMOTIVE BODIES OR AUTOMOTIVE BODY PARTS

BACKGROUND OF THE INVENTION

1. Field of the Invention

The invention relates to a process for preparing automotive bodies or automotive body parts coated with multiple coating layers.

2. Description of Related Art

It is known from U.S. Pat. No. 5,908,667 to provide automotive bodies and automotive body parts with a multi-layer coating comprising a corrosion protection ectrocoating layer, a second electrocoating layer determining the color shade and an outer protective clear coat layer.

It is known from U.S. Pat. No. 5,882,734 to provide automotive bodies and automotive body parts with a multi-layer coating comprising two successive electrodipcoated layers, a base coat layer determining the color shade and an outer protective clear coat layer.

For reasons of rationalising procedures and saving on materials, in automotive coating there is a need to reduce the number of operations and of coating layers without, however, allowing substantial sacrifices to be made in terms of the conventional overall characteristics of the coatings obtained. Automotive coatings have to fulfil the reqirements of car manufacturers in particular as regards corrosion protection, stone chip resistance and weathering resistance. With respect to corrosion protection, an electrocoating composition must have high throwing power. "Throwing power" is a term of art used to identify the ability of an electrocoating composition to be deposited within voids of a three-dimensional substrate, which is significant for effective corrosion protection. In other words, without high throwing power the electrocoating agent has only low ability to coat recesses, crevices and other internal surfaces of the automotive body and cannot provide adequate corrosion resistance to automotive bodies and body parts. The automotive bodies would be prone to rusting from the internal surface.

SUMMARY OF THE INVENTION

The present invention satisfies the need for a process for preparing automotive coatings which saves on materials and comprises few process steps. The coatings prepared using the process of the present invention also meet the high demands made of automotive coatings, in particular as regards corrosion protection, including corrosion protection of internal surfaces, stone chip resistance and weathering resistance.

Thus the present invention is a process for preparing a multi-layer coating in which a first coating layer of a cathodic electrodeposition coating composition is applied by cathodic electrodeposition to an electrically conductive automotive body or an electrically conductive automotive body part and, as the outer coating layer, a clear coating is applied, in which between the application of the cathodic electrodeposition coating layer and the clear coating a further coating layer can be applied, and in which the cathodic electrodeposition coating composition contains, as the cathodic electrodeposition binder, a seed polymer with an amine value of 30 to 100 mg KOH/g and a hydroxyl value of 50 to 200 mg KOH/g, which can be prepared by radical polymerisation of 70 to 97 wt-% of a monomer mixture comprising hydroxyfunctional olefinically unsaturated monomer (one or more) and amino-functional olefinically unsaturated monomer (one or more) in the presence of 3 to 30 wt-% of an aminoepoxy resin.

A first embodiment of the invention comprises a process for preparing a multi-layer coating in which a coating layer of a cathodic electrodeposition coating composition determining the color shade of the multi-layer coating is cathodically electrodeposited onto an electrically conductive automotive body or an electrically conductive automotive body part and is then baked and thereafter is provided with a clear coating, in which the cathodic electrodeposition coating composition contains, as the cathodic electrodeposition binder, a seed polymer with an amine value of 30 to 100 mg KOH/g and a hydroxyl value of 50 to 200 mg KOH/g, which can be prepared by radical polymerisation of 70 to 97 wt-% of a monomer mixture comprising hydroxy-functional olefinically unsaturated monomer and amino-functional olefinically unsaturated monomer in the presence of 3 to 30 wt-% of an aminoepoxy resin.

A second embodiment of the invention comprises a process for preparing a multi-layer coating in which a first coating layer of a cathodic electrodeposition coating composition is cathodically electrodeposited onto an electrically conductive automotive body or an electrically conductive automotive body part and baked, where, before or after baking the cathodic electrodeposition coating layer, a coating layer of a liquid coating composition determining the color shade of the multi-layer coating is sprayed on and is then provided with a clear coating, in which the cathodic electrodeposition coating composition contains, as the cathodic electrodeposition binder, a seed polymer with an amine value of 30 to 100 mg KOH/g and a hydroxyl value of 50 to 200 mg KOH/g, which can be prepared by radical polymerisation of 70 to 97 wt-% of a monomer mixture comprising hydroxy-functional olefinically unsaturated monomer and amino-functional olefinically unsaturated monomer in the presence of 3 to 30 wt-% of an aminoepoxy resin.

DETAILED DESCRIPTION OF THE EMBODIMENTS

The cathodic electrodeposition coating composition used in the process according to the invention for applying the first coating layer is an aqueous coating composition with a solids content of for example 10 to 30 wt-%. The solid comprises the seed polymer used as the cathodic electrodeposition binder, described below in more detail, and cross-linking agents, pigments and optionally additional binders, paste resin, fillers and non-volatile additives conventionally used in coatings.

The cathodic electrodeposition coating composition used in the process according to the invention contains as the cathodic electrodeposition binder an aminoepoxy/vinyl polymer hybrid binder. This is a seed polymer with an amine value of 30 to 100 mg KOH/g and a hydroxyl value of 50 to 200 mg KOH/g, which can be obtained by radical polymerisation of 70 to 97 wt-% of a monomer mixture comprising hydroxy-functional olefinically unsaturated monomers and amino-functional olefinically unsaturated monomers in the presence of 3 to 30 wt-% of an aminoepoxy resin.

Aminoepoxy resins are known to the person skilled in the art as cathodic electrodeposition binders and are for example described in the patent literature in a vast range of modifications. They are addition products of amine compounds and polyepoxides. Although said addition products are preferred representatives of aminoepoxy resins, the term "aminoepoxy resin" used here is intended to include aminoepoxy resin derivatives such as epoxide/carbon dioxide/amine reaction products. Epoxide/carbon dioxide/amine reaction products are to be understood as addition products of amine compounds and partially or completely carbonated polyepoxides. Partially or completely carbonated polyepoxides are polyepoxides in which some or all epoxy groups have been reacted with carbon dioxide to give 5-membered cyclic carbonate groups, so-called 2-oxo-1,3-dioxolan-4-yl groups. The amino groups can be present as substituents and/or as a component of the polymer backbone in the aminoepoxy resin.

Aminoepoxy resins can for example be prepared by reacting aromatic epoxy resins with primary and/or secondary mono- and/or polyamines. The reaction can be carried out in organic solution or in the melt. If the reaction is performed in organic solution, water-miscible solvents, for example alcohols such as isopropanol, isobutanol, n-butanol; glycol ethers such as methoxypropanol, butoxyethanol; glycol ether esters such as butyl glycol acetate, or water-immiscible solvents such as xylene can be used as solvents or solvent mixtures. Aromatic epoxy resins include epoxy group containing aromatic polyglycidyl ethers. Aromatic polyglycidyl ethers can be obtained for example from reacting polyphenols, preferably diphenols and in particular multi-nuclear diphenols, with epichlorohydrin. To synthesise aminoepoxy resins, it is preferable to use as the aromatic epoxy resins those which have or whereof the mixture has an epoxy and/or cyclocarbonate equivalent weight between 170 and 1000. Particularly preferred aromatic epoxy resins here are the conventional commercially available epoxy resins which are obtained primarily from reacting diphenylol propane (bisphenol A) with epichlorohydrin. The mono- and/or polyamines can, in addition to the primary and/or secondary amino groups, also contain further functional groups, in particular hydroxyl groups and/or tertiary amino groups. Examples of mono- and/or polyamines with primary and/or secondary amino groups and optionally further functional groups are methylamine, ethylamine, propylamine, butylamine, octylamine, 2-ethylhexylamine, dimethylamine, diethylamine, dipropylamine, dibutylamine, methylbutylamine, morpholine, stearylamine, diethyl aminoethylamine, dimethyl aminopropylamine, lauryl propylenediamine, diethylenetriamine, N,N'-bis-(isohexyl)-1,6-diaminohexane, ethanolamine, propanolamine, ethylene glycol (2-amino-ethyl) ether, N-methylaminoethanol or diethanolamine, 1:2 adducts of diprimary amine such as 1,6-diaminohexane or 2-methylpentamethylene diamine and monoepoxide such as glycidyl ethers or esters or monoepoxyalkanes.

It is advantageous if the aminoepoxy resins used to prepare the seed polymers have a hydroxyl value of 50 to 300 mg KOH/g and an amine value of 40 to 200, preferably 50 to 170 and in particular 90 to 130 mg KOH/g. The aminoepoxy resins can contain olefinically unsaturated double bonds, or be free thereof, and they can have modifications conventional for aminoepoxy resins.

Examples of hydroxy-functional olefinically unsaturated monomers which can be used as a component of the monomer mixture to undergo radical polymerisation in the presence of aminoepoxy resin are hydroxyalkyl (meth)acrylates such as hydroxyethyl (meth)acrylate, the isomeric bydroxypropyl and hydroxybutyl (meth)acrylates and alkoxylation and/or lactonisation products of hydroxyalkyl (meth)acrylates, and mixtures thereof. Examples of such alkoxylation products are reaction products of hydroxyalkyl (meth)acrylates and alkylene oxides like ethylene oxide and/or propylene oxide. Examples of lactonisation products are reaction products of hydroxyalkyl (meth)acrylates and lactones, in particular epsiloncaprolactone.

Examples of amino-functional olefinically unsaturated monomers which can be used as a component of the monomer mixture to undergo radical polymerisation in the presence of aminoepoxy resin are aminoalkyl (meth)acrylates and aminoalkyl (meth)acrylamides with for example 2 to 4 C atoms in the alkylene group linking the amino group and the (meth)acryloyl or the (meth)acrylamide group. The amino groups are in particular secondary or tertiary amino groups. Examples of such monomers are methyl aminoethyl (meth)acrylate, dimethyl aminoethyl (meth)acrylate, diethyl aminoethyl (meth)acrylate, tert.-butyl aminoethyl (meth) acrylate, n-butyl aminoethyl (meth)acrylate, dimethyl aminopropyl (meth)acrylate, diethyl aminopropyl (meth) acrylate and diethyl aminoethyl (meth)acrylamide, and mixtures thereof.

In addition to the hydroxy-functional and the amino-functional olefinically unsaturated monomers, the monomer mixture generally also contains further copolymerisable olefinically unsaturated monomers. Selection of these is in general made from olefinically unsaturated monomers without further functional groups. Examples of such comonomers are monovinyl aromatic compounds such as styrene, vinyl toluene, methyl styrene; vinyl esters of aliphatic carboxylic acids, such as vinyl acetate, vinyl propionate, vinyl versatate; vinyl ethers, for example methyl, ethyl or alkyl vinyl ether with 3 to 6 C atoms; in particular, however, (cyclo)alkyl (meth)acrylates, such as methyl (meth)acrylate, ethyl (meth)acrylate, propyl (meth)acrylate, isopropyl (meth)acrylate, the various isomeric butyl (meth)acrylates, n-pentyl (meth)acrylate, amyl (meth)acrylate, n-hexyl (meth)acrylate, cyclohexyl (meth)acrylate, isomeric octyl (meth)acrylate, for example 2-ethyl hexyl (meth)acrylate, n-decyl (meth)acrylate, n-dodecyl (meth)acrylate, lauryl (meth)acrylate, stearyl (meth)acrylate and isobornyl (meth) acrylate.

The composition of the monomer mixture is advantageously for example 15 to 30 wt-% of hydroxy-functional olefinically unsaturated monomers, 5 to 25, preferably 7 to 20 wt-% of amino-functional olefinically unsaturated monomers and 50 to 80 wt-% of further olefinically unsaturated comonomers. The content of further olefinically unsaturated comonomers comprising aromatic hydrocarbon groups is advantageously not more than 0 wt-% in the monomer mixture. (Cyclo)alkyl (meth)acrylates with 1 to 18 carbon atoms in the (cyclo)alkyl group are preferred as further olefinically unsaturated comonomers.

The seed polymers can be prepared by radical copolymerisation of the monomer mixture comprising the hydroxy-functional and the amino-functional olefinically unsaturated monomers in the presence of aminoepoxy resin. The term "monomer mixture" does not exclude the possibility of a separate, for example successive or alternating addition of the different olefinically unsaturated monomers, but in general the monomers are added as a mixture. The radical polymerisation of the monomer mixture builds up the vinyl polymer portion of the aminoepoxy/vinyl polymer hybrid binder. This can be a copolymerisation or graft polymerisation of the olefinically unsaturated monomers with or onto olefinic double bonds of the aminoepoxy resin, or polymerisation takes place in the presence of an aminoepoxy resin free of olefinic double bonds, or there is a graft polymerisation of the olefinically unsaturated monomers onto the aminoepoxy portion of the aminoepoxy/vinyl polymer hybrid binder initiated by hydrogen abstraction of the aminoepoxy resin.

The polymerisation is carried out with the addition of conventional radical initiators, for example peroxide or azo initiators; these are standard methods of radical copolymerisation known to the person skilled in the art, which require no explanation.

Preferably, the radical polymerisation is not carried out in the presence of a melt, but in the presence of an organic solution of the aminoepoxy resin, in particular in water-miscible organic solvents. Examples of water-miscible organic solvents are the solvents mentioned above in connection with the preparation of the aminoepoxy resins. Preferably, the procedure is such that, once the radical polymerisation is complete, organic solutions with a seed polymer content of 50 to 90, in particular 60 to 80 wt-% are obtained.

The aminoepoxy resin and the hydroxy-functional, the amino-functional and optionally further olefinically unsaturated comonomers to undergo radical polymerisation in the presence of the aminoepoxy resin are used in a ratio such that the aminoepoxy/vinyl polymer hybrid binder obtained once the radical polymerisation is complete is composed of 3 to 30, preferably 5 to 20 wt-% of aminoepoxy resin portion and 97 to 70, preferably 95 to 80 wt-% of the hydroxy- and amino-functional vinyl polymer portion and has an amine value of 30 to 100, preferably 40 to 70 mg KOH/g and a hydroxyl value of 50 to 200, preferably 80 to 150 mg KOH/g.

Particularly preferred seed polymers are those seed polymers known from U.S. Pat. No. 5,272,188 and prepared by the process described therein, to which reference is made here explicitly but not restrictively. The seed polymers made by the process of U.S. Pat. No. 5,272,188 are prepared by radical polymerisation of 70 to 97 wt-% of a monomer mixture comprising 7 to 20 wt-% of (meth)acrylates having secondary or tertiary amino groups, 15 to 30 wt-% of hydroxy-functional (meth)acrylates, 50 to 78 wt-% of C1-C18-alkyl (meth)acrylates and up to 10 wt-% of aromatic vinyl monomers in the presence of 3 to 30 wt-% of aminoepoxy resin, in which both the monomer mixture and the aminoepoxy resin each contain at least 5 wt-% of identical aliphatic groups having 7 to 18 carbon atoms. The seed polymers can be used as electrocoating binders which are suitable for the preparation of electrocoating agents which are cathodically electrodepositable and which are used as primer and one-layer paint to provide pale-colored, non-yellowing, glossy coating films which are corrosion resistant and resistant to washing agents, UV, and weathering. No indication is given that these electrocoating agents satisfy the needs of multilayer coating of automotive bodies or body parts.

After neutralisation of at least some of the alkaline amino groups with acid, the seed polymers can be converted to the water phase. Examples of acids which can be used are formic acid, lactic acid, acetic acid, methanesulphonic acid and amidosulphonic acid. Here, before and/or after the water is added, organic solvent can be removed to give the desired content, for example by distilling it off at reduced pressure.

The cathodic electrodeposition coating compositions used in the process according to the invention contain cross-linking agents for the seed polymers used as cathodic electrodeposition binder. Examples are conventional cross-linking agents known for cathodic electrodeposition coating compositions, such as aminoplastic resins, blocked polyisocyanates or cross-linking agents containing groups capable of transesterification. Preferably, the cross-linking agents comprise more than 50 wt-%, in particular for example 100 wt-% of blocked polyisocyanates.

The seed polymer and cross-linking agents are present in the cathodic electrodeposition coating compositions in a ratio of 60 to 90:40 to 10 wt-%.

As well as the seed polymers used as the cathodic electrodeposition binder and the cross-linking agents, the cathodic electrodeposition coating compositions can also contain up to 25 wt-% of other binders, in relation to the total amount of seed polymer and cross-linking agent. Examples are cathodic electrodeposition binders different from the seed polymers, or non-ionic binders. The optionally contained additional binders are in particular binders which do not chalk under the action of UV radiation.

In addition to the seed polymers and cross-linking agents, the cathodic electrodeposition coating compositions contain pigments, for example conventional inorganic and/or organic color pigments such as carbon black, titanium dioxide, iron oxide pigments, phthalocyanine pigments and quinacridone pigments. The cathodic electrodeposition coating compositions can contain fillers, such as for example kaolin, talcum or silicon dioxide.

The pigments and fillers can be dispersed to give pigment pastes, for example using known paste resins.

As additives, the conventional additives, as are known in particular for cathodic electrodeposition coating compositions, are possible. Examples of these are wetting agents, neutralising agents, flow control agents, catalysts, corrosion inhibitors, anti-crater agents, antifoaming agents, solvents, light protecting agents and antioxidants.

The cathodic electrodeposition coating compositions are preferably lead-free, i.e. preferably they contain no lead-containing pigments, corrosion protection additives or catalysts.

The cathodic electrodeposition coating compositions can be prepared by the known processes for preparing cathodic electrodeposition baths, i.e. in principle either using the so-called one-component or using the so-called two-component method.

When preparing the cathodic electrodeposition coating compositions by the one-component method, it is possible for example to proceed such that pigments and/or fillers are dispersed in one part of the seed polymer used as the cathodic electrodeposition binder and/or cross-linking agent and then for example the dispersion is ground in a bead mill, after which the process is completed by mixing with the as yet missing part of the cathodic electrodeposition binder and/or cross-linking agent. The cathodic electrodeposition coating composition can then be prepared from the material obtained by neutralisation with acid and dilution with water.

When preparing the cathodic electrodeposition coating compositions by the two-component method, it is possible for example to proceed such that a pigmented cathodic electrodeposition coating composition is prepared from an aqueous dispersion of the seed polymer used as the cathodic electrodeposition binder and the cross-linking agent by mixing it with a separate pigment paste.

In the second embodiment of the process according to the invention, a coating layer determining the color shade of the multi-layer coating is applied to the cathodic electrodeposition coating layer before the clear coating is applied. For this purpose, in particular color- and/or effect-imparting base coats can be used in the same way that they are used for the preparation of base coat/clear coat two-layer coatings and as are known in numerous examples from the patent literature, for example.

The base coats are in the form of liquid coating compositions. These can be of a one-component or multi-component nature. They can be systems based on organic solvents, or water-borne base coats. The base coats can be of a physically drying nature or such that they can be cross-linked by forming covalent bonds.

In addition to volatile components such as water and/or organic solvents and solid components such as binders and optionally cross-linking agents, the base coats contain inorganic and/or organic color pigments and/or effect pigments, such as for example titanium dioxide, iron oxide pigments, carbon black, azo pigments, phthalocyanine pigments, quinacridone pigments, metal pigments, for example those of titanium, aluminium or copper, interference pigments, such as for example titanium dioxide coated aluminium, coated mica, iron oxide in flake form and copper phthalocyanine pigments in flake form.

Furthermore, the base coats can contain additives conventionally used in coatings, such as for example fillers, catalysts, flow control agents, anti-crater agents, light protecting agents and antioxidants.

In the process according to the invention, application is made either directly onto the baked cathodic electrodeposition coating layer (first embodiment) or, if a coating layer determining the color shade of the multi-layer coating has been applied to the cathodic electrodeposition coating layer (second embodiment), a clear coating comprising one or more clear coat layers is applied.

As the clear coating composition for producing the one or more clear coat layers, all conventional clear coats are suitable. These can be one- or multi-component clear coats. They can be solvent-free (liquid or in the form of a powder clear coat), or they can be systems based on solvents, or they are water-dilutable clear coats. The water-dilutable clear coat systems can be water-soluble systems or systems dispersed in water, for example emulsion systems or powder clear coat dispersions.

Instead of an outer clear coating, it is also possible to apply a transparent film by adhesion.

In the process according to the invention, electrically conductive automotive bodies or parts thereof are coated. They comprise for example pretreated, for example phosphated and optionally passivated or electrically conductively precoated metal, or they are automotive bodies (or body parts) made by joining together several different metals and/or combinations of metal and plastic parts in a mixed construction. Examples of metals are galvanised or ungalvanised steel, aluminium and light metal alloys. The first coating layer of the cathodic electrodeposition coating composition is cathodically electrodeposited onto these substrates in conventional manner in a dry film thickness of for example 15 to 40 $\mu$m, and baked for example at temperatures between 130 and 180° C. The data given for the dry film thickness here relate to the film thickness on the visible surfaces accessible to the observer. The dry film thickness in the regions not directly accessible to the observer, for example in restricted cavities in an automotive body, is smaller. However, the corrosion protection of such restricted cavities is effective due to the high throwing power of the electrocoating composition used in the process according to the invention.

In the second embodiment of the process according to the invention, a coating layer determining the color shade of the multi-layer coating is applied to the cathodic electrodeposition coating layer before the clear coating is applied, by spraying on a liquid coating composition. The coating layer determining the color shade of the multi-layer coating can be applied wet-on-wet onto the pre-dried, not yet baked cathodic electrodeposition coating layer, and be baked together with the latter under the baking conditions mentioned above for the cathodic electrodeposition coating layer. It is however preferred to apply the coating layer determining the color shade of the multi-layer coating onto the already baked cathodic electrodeposition coating layer. The spray application is preferably carried out with a color- and/or effect-giving base coat with a dry film thickness of for example 8 to 40 $\mu$m, dependent on the color shade. Examples of spray processes are compressed-air spraying, airless spraying or electrostatic high-speed rotary spraying. Preferably, application of the base coat is carried out substantially only in outer regions, in particular on surfaces of the substrate visible to the observer, i.e. for example not in restricted cavities in an automotive body.

In both embodiments of the process according to the invention, an outer clear coating of one or more clear coat layers is applied. If several clear coat layers are applied, they can be of the same or different clear coats. Preferably, only one clear coat layer is applied. The application of the clear coat layer(s) is carried out by spraying with a dry film thickness of 40 to 100 $\mu$m. Examples of spraying processes are compressed-air spraying, airless spraying or electrostatic high-speed rotary spraying. Preferably, application of the clear coat is carried out substantially only in outer regions, in particular on surfaces visible to the observer, i.e. for example not in restricted cavities in an automotive body. If in the case of the second embodiment of the process according to the invention a base coat layer has been applied to the already baked cathodic electrodeposition coating layer, the clear coating is preferably applied to the base coat layer, which has been pre-dried by flashing off, i.e. after a short flash-off phase, for example at 20 to 80° C., in a wet-on-wet process. The clear coat layer(s) are chemically cross-linked by baking for example at temperatures of 80 to 160° C.

The total film thickness of the multi-layer coatings prepared by the process according to the invention is preferably 80 to 120 $\mu$m.

The cathodic electrodeposition coating layer can either be provided only with a clear coating (first embodiment), or it is provided with a coating layer determining the color shade and/or the effect of the multi-layer coating and a clear coating (second embodiment). In the case of the multi-layer coatings obtained in accordance with the first embodiment of the process according to the invention, the color shade is determined from the cathodic electrodeposition coating layer applied directly to the substrate surface. The color shade and/or effect of the multi-layer coatings obtained in accordance with the second embodiment of the process according to the invention, on the other hand, are determined by the coating layer applied to the cathodic electrodeposition coating layer.

The first embodiment is suitable in particular for the preparation of single-color multi-layer coatings, whereas effect multi-layer coatings can preferably be prepared in accordance with the second embodiment of the process according to the invention. It goes without saying that single-color multi-layer coatings can also be prepared in accordance with the second embodiment of the process according to the invention.

The first embodiment of the process according to the invention is suitable in particular for the preparation of automotive bodies (or body parts) coated with multiple layers and prepared in only one or a limited number of color shades, for example in not more than three color shades. The automotive bodies (or body parts) are then cathodically electrocoated in a number of cathodic electrodeposition baths of different single-color shades corresponding to the color shade range, and are then provided with a clear coating.

The second embodiment of the process according to the invention is suitable in particular for the preparation of automotive bodies (or body parts) coated with multiple layers and prepared in a relatively large number of color shades, for example more than three. The automotive bodies (or body parts) can in this case be cathodically electrocoated in a single-color shade, and then provided with a base coat/clear coat two-layer coating in the desired color shades.

In the case of preparing automotive bodies (or body parts) coated with multiple layers in several different color shades, in particular in a color shade range composed of a plurality of single-color shades and effect color shades, it is particularly advantageous to combine the first and second embodiments of the process according to the invention. In this case the automotive bodies (or body parts) can be cathodically electrocoated in one or more different single-color shades, of which part is then provided with a clear coating and the remaining part is provided with a base coat/clear coat two-layer coating in further color shades. Advantageously, the color shades of the automotive bodies (or body parts) provided only with a single-color cathodic electrodeposition coating layer and clear coating are the single-color shade or shades making up the largest proportion of the color shade range of current production.

The process according to the invention enables the preparation of multi-layer coatings on automotive bodies and automotive body parts with good corrosion protection, stone chip resistance and weathering resistance. The good corrosion protection here is the result of the corrosion-protective action of the multi-layer coating prepared according to the invention and the good throwing power behaviour of the cathodic electrodeposition coating composition used. The process according to the invention also saves on materials and requires only few process steps.

EXAMPLES

Example 1

A white cathodic electrodeposition coating composition according to U.S. Pat. No. 5,272,188, Table 4, Example 3 was prepared (containing a seed polymer as cathodic electrocoating binder having an amine number of 41 mg KOH/g and a hydroxyl number of 81 mg KOH/g; the seed polymer consisted of a 10 wt-% aminoepoxy portion and a 90 wt-% vinyl polymer portion).

The throwing power behaviour of the cathodic electrodeposition coating composition was determined as described below. A throwing power box made by joining together zinc phosphated automotive steel plates and switched as the cathode immersed at a depth of 27 cm in a 10-litre bath of the cathodic electrodeposition coating composition was coated at a deposition voltage of 300 V for 2 minutes at 30° C. and, after being rinsed with de-ionised water for 15 minutes at 175° C. (object temperature), was baked. The cathodic electrodeposition film thickness on the outside of the throwing power box was 20 $\mu$m. The coating result was evaluated in accordance with VDA [German automotive industry] recommendation 621-180. The 5 $\mu$m limit for the internal film thickness serving as a measure for the throwing power obtained was 15 cm. The line of corrosion was also determined. The rust-free zone was 18 cm in length. The corrosion test was performed as a 240-hour salt spray test in accordance with DIN 53 167.

Example 2

A powder clear coat was prepared:

729 g of an epoxy-functional methacryl copolymer with an epoxy-weight equivalent of 380 and an average molecular weight (Mn) of 2000, 210 g of 1,12-dodecanedioic acid, 30 g of a light protecting agent (1:1 mixture of Tinuvin® 900 (UV absorber) and Tinuvin® 111 (sterically hindered amine light protecting agent), both from the company Ciba), 3 g of benzoin, 6 g of Irganox® B 225 (antioxidant) from the company Ciba and 8 g of Troy® EX 570 (levelling agent) from the company Troy Chemie were first mixed in a dry state and then dispersed at 100 to 120° C. by means of an extruder. After cooling off and pre-comminuting of the extrudate the latter was milled in an air separation ball mill to an average particle size ($d_{50}$) of 20 $\mu$m to give a powder clear coat.

Example 3

A white multi-layer coating was prepared according to the invention:

Zinc phosphated automotive steel plates were cathodically electrocoated in a dry film thickness of 30 $\mu$m using the white cathodic electrodeposition coating composition from Example 1 in conventional manner. After baking the cathodic electrodeposition coating layer for 15 minutes at an object temperature of 175° C., it was overcoated with the powder clear coat from Example 2 in a dry film thickness of 60 $\mu$m and baked for 30 minutes at 145° C. (object temperature). The white multi-layer coating prepared in this manner was subjected to technological testing.

The Ford stone chip test EU-BI 157-04 gave a characteristic value of 2–3.

Both the accelerated weathering test carried out in accordance with the VDA recommendation 621-415 (cycle between exposure to salt spray, exposure to condensation and rest phases) and the 12-month outdoor weathering test carried out in accordance with VDA recommendation 621-414 (includes periodic exposure to salt in order to tighten up the test) gave a value of 1.5 mm for under-film corrosion at the location of incision.

The white multi-layer coating showed no signs of chalking or delamination after weathering tests with UV irradiation.

The examples above demonstrate the suitability of the multi-layer coatings prepared in accordance with the process according to the invention for the automotive sector. The test results are within those of the specifications required by automotive manufacturers. Comparable test results were obtained if, instead of the white pigmenting of the cathodic electrodeposition coating composition, other pigmenting was selected, or if the clear coating was produced from other clear coats conventional for automotive mass production instead of from the powder clear coat or if a color coat were used between the cathodically electrodeposited coating layer and the clear coat.

What is claimed is:

1. A process for preparing a multi-layer coating, comprising applying a first coating layer of a cathodic electrodeposition coating composition by cathodic electrodeposition to an electrically conductive automotive body or electrically conductive automotive body part and optionally, baking the first coating layer;

applying a second coating layer comprising binder and pigments that determine the color shade of the multi-layer coating; and applying, as the outer coating layer, a clear coating, and wherein the cathodic electrodeposition coating composition comprises a cathodic electrodeposition binder comprising a seed polymer with an amine value of 30 to 100 mg KOH/g and a hydroxyl value of 50 to 200 mg KOH/g prepared by radical polymerization of 70 to 97 wt-%, based on the weigh of the binder, of a monomer mixture comprising hydroxy functional olefinically unsaturated monomers and amino-functional olefinically unsaturated monomers in the presence of 3 to 30 wt-%, based on the weight of the binder, of an aminoepoxy resin.

2. A process according to claim 1 in which the second coating layer that determines the color shade of the multi-layer coating is applied after baking of the first coating layer of the cathodic electrodeposition coating composition.

3. A process according to claim 1, in which the multi-layer coating is a single-color or an effect multi-layer coating.

4. A process according to claim 1, in which the outer clear coating comprises one or more clear coat layers.

5. A process according to claim 1, in which the total film thickness of the multi-layer coating is 80 to 120 $\mu$m.

6. Automotive bodies or automotive body parts coated with multi-layer coatings and prepared according to claim 1.

7. A process for preparing a multi-layer coating, consisting essentially of applying a first coating layer of a cathodic electrodeposition coating composition by cathodic electrodeposition to an electrically conductive automotive body or electrically conductive automotive body part and baking the first coating layer, applying, as the outer layer, a clear coating, and wherein the cathodic electrodeposition coating composition comprises pigments that determine the color shade of the multi-layer coating and wherein the cathodic electrodeposition binder comprises a seed polymer with an amine value of 30 to 100 mg KOH/g and a hydroxyl value of 50 to 200 mg KOH/g prepared by radical polymerization of 70 to 97 wt-%, based on the weight of the binder, of a monomer mixture comprising hydroxy functional olefinically unsaturated monomers and aminofunctional olefinically unsaturated monomers in the presence of 3 to 30 wt-%, based on the weight of the binder, of an aminoepoxy resin.

8. A process according to claim 7 in which the outer clear coating layer comprises one or more clear coating layers.

9. A process according to claim 7 in which the total film thickness of the multi-layer coating is 80 to 120 $\mu$m.

10. Automotive bodies or automotive body parts coated with multi-layer coatings prepared according to the process of claim 7.

* * * * *

UNITED STATES PATENT AND TRADEMARK OFFICE
CERTIFICATE OF CORRECTION

PATENT NO.    : 6,368,719 B1
DATED         : April 9, 2002
INVENTOR(S)   : Ludwig Siever, Walter Kuehhirt, Klausjoerg Klein and Karl-Friedrich Doessel It is certified that error appears in the above-identified patent and that said Letters Patent is hereby corrected as shown below:

<u>Column 1,</u>
Line 14, replace "ectrocoating" with -- electrocoating --.

<u>Column 4,</u>
Line 45, replace "0 wt-%" with -- 10 wt-% --.

Signed and Sealed this

Twenty-fifth Day of June, 2002

Attest:

JAMES E. ROGAN
Attesting Officer
Director of the United States Patent and Trademark Office